United States Patent
Ohtomo

(10) Patent No.: US 10,960,890 B2
(45) Date of Patent: Mar. 30, 2021

(54) IDLING STOP CONTROL DEVICE

(71) Applicant: SUBARU CORPORATION, Tokyo (JP)

(72) Inventor: Yosuke Ohtomo, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 31 days.

(21) Appl. No.: 16/420,612

(22) Filed: May 23, 2019

(65) Prior Publication Data
US 2020/0086878 A1    Mar. 19, 2020

(30) Foreign Application Priority Data
Sep. 18, 2018   (JP) .............................. JP2018-173270

(51) Int. Cl.
*B60W 30/192*       (2012.01)
*B60W 30/18*        (2012.01)
(Continued)

(52) U.S. Cl.
CPC ......... *B60W 30/192* (2013.01); *B60R 25/001* (2013.01); *B60R 25/24* (2013.01);
(Continued)

(58) Field of Classification Search
CPC .. B60R 25/001; B60R 25/24; B60W 2520/10; B60W 2540/00;
(Continued)

(56) References Cited

U.S. PATENT DOCUMENTS

| | | | |
|---|---|---|---|
| 6,371,889 B1 * | 4/2002 | Kuroda | B60K 6/485 477/181 |
| 6,463,900 B1 * | 10/2002 | Wakabayashi | G08G 1/096783 123/179.4 |

(Continued)

FOREIGN PATENT DOCUMENTS

| | | | |
|---|---|---|---|
| JP | 2004-169692 A | 6/2004 | |
| JP | 2006-214357 A | 8/2006 | |

(Continued)

OTHER PUBLICATIONS

Japanese Office Action, dated Jan. 7, 2020, in Japanese Application No. 2018-173270 and English Translation thereof.

*Primary Examiner* — Babar Sarwar
(74) *Attorney, Agent, or Firm* — McGinn I.P. Law Group, PLLC.

(57) ABSTRACT

An idling stop control device includes an authenticator, a storage, a getting-off detector, and an engine restart permitter. The authenticator is installed in a vehicle, performs authentication via a wireless communication with a mobile device, and repeatedly performs, while the vehicle travels, an authentication operation at predetermined intervals. The storage stores result and time of authentication as the authentication history during travel. The engine restart permitter determines permission or prohibition of restart of the engine in accordance with the authentication history and getting-off information, permits restart of the engine when the authentication is successful and permits, in a case where the authentication fails, restart of the engine when a history of success of authentication has been stored in the storage during travel and the getting-off is not detected after the authentication has been successful.

14 Claims, 3 Drawing Sheets

(51) Int. Cl.
  *B60R 25/00* (2013.01)
  *B60R 25/24* (2013.01)
  *F02N 11/08* (2006.01)

(52) U.S. Cl.
  CPC ... *B60W 30/18054* (2013.01); *F02N 11/0822* (2013.01); *B60W 2520/10* (2013.01); *B60W 2540/00* (2013.01); *B60W 2556/45* (2020.02); *B60W 2710/06* (2013.01); *B60Y 2300/192* (2013.01); *F02N 2011/0881* (2013.01)

(58) Field of Classification Search
  CPC ....... B60W 2554/802; B60W 2556/45; B60W 2710/06; B60W 30/18054; B60W 30/192; B60Y 2300/192; F02N 11/0807; F02N 11/0814; F02N 11/0822; F02N 2011/0881; F02N 2200/0802; F02N 2200/0815; F02N 2200/101; F02N 2200/106; F02N 2200/125; F02N 2300/304; Y02T 10/40
  See application file for complete search history.

(56) References Cited

U.S. PATENT DOCUMENTS

| | | | | |
|---|---|---|---|---|
| 6,504,259 | B1* | 1/2003 | Kuroda | B60L 58/20 290/40 C |
| 6,532,926 | B1* | 3/2003 | Kuroda | B60H 1/00778 123/179.4 |
| 6,535,142 | B2* | 3/2003 | Wakabayashi | G08G 1/096758 340/929 |
| 6,865,451 | B2* | 3/2005 | Onoyama | B60R 25/00 701/2 |
| 8,904,984 | B2* | 12/2014 | Hanft | F02N 11/0803 123/179.4 |
| 2001/0018903 | A1* | 9/2001 | Hirose | B60W 10/30 123/179.4 |
| 2003/0160510 | A1* | 8/2003 | Mizutani | F02N 11/0814 307/10.1 |
| 2004/0093127 | A1* | 5/2004 | Onoyama | F02N 11/0825 701/1 |
| 2006/0236970 | A1* | 10/2006 | Inada | B60R 25/102 123/179.4 |
| 2012/0095670 | A1* | 4/2012 | Piggott | F02D 17/04 701/112 |
| 2013/0054060 | A1* | 2/2013 | Dupuy | F02D 17/04 701/22 |
| 2016/0090105 | A1* | 3/2016 | Neubecker | A62C 3/07 701/23 |
| 2016/0209224 | A1* | 7/2016 | Dickow | G06Q 10/02 |

FOREIGN PATENT DOCUMENTS

| | | |
|---|---|---|
| JP | 2006-214358 A | 8/2006 |
| JP | 2006-307694 A | 11/2006 |
| JP | 2010-133364 A | 6/2010 |

\* cited by examiner

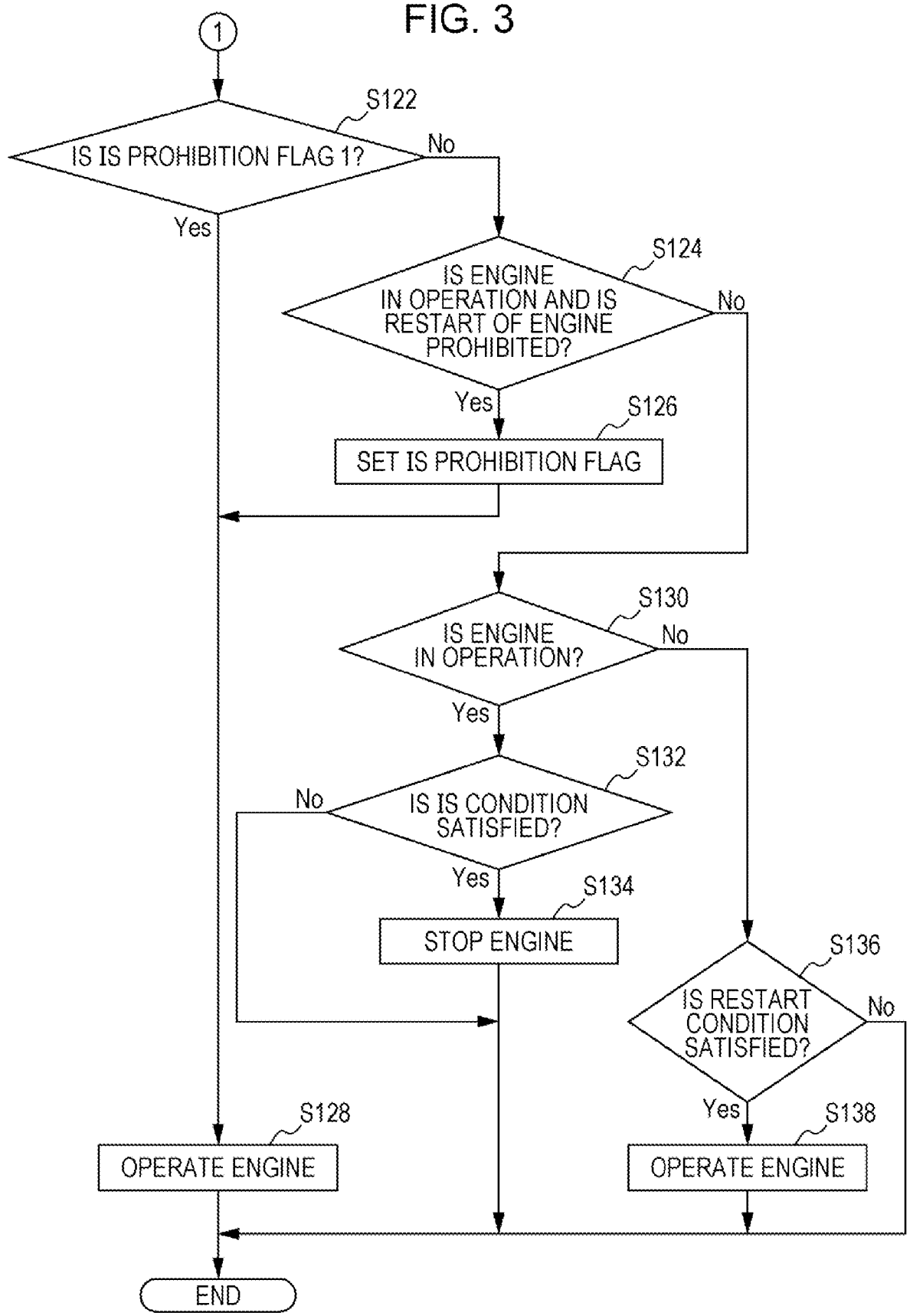

IDLING STOP CONTROL DEVICE

CROSS-REFERENCE TO RELATED APPLICATIONS

The present application claims priority from Japanese Patent Application No. 2018-173270 filed on Sep. 18, 2018, the entire contents of which are hereby incorporated by reference.

BACKGROUND

The disclosure relates to an idling stop control device and, in particular, relates to an idling stop control device applicable to a vehicle in which a so-called smart entry system is installed.

In recent years, from a view point of improving fuel economy and reducing emissions in vehicles, for example, vehicles which include an idling stop function (an idling stop system) configured to automatically stop an engine, for example, when the vehicle stops to wait for a traffic signal to change at an intersection (at a time of parking) have been in wide practical use. In an idling stop system, when an engine is in an idling stop state, and then, for example, release of stepping on a brake pedal is detected, an engine restart request is output and the engine is restarted.

On the other hand, in recent years, in order to prevent a theft of a vehicle, vehicles which include a so-called smart entry system (SES) have been in practical use. In the smart entry system, for example, when a wireless communication is performed between a vehicle-side communication device (an onboard device) which is mounted on a vehicle and a mobile communication device (a mobile device) which is carried by an occupant and an ID code transmitted from the mobile device is authenticated to be a valid ID code (that is, when ID codes of both sides match), release of a door lock or start of an engine is permitted.

There is a possibility that, in a case where vehicles on which a radio device with a high output is mounted stop at an intersection or the like in front of and behind (or at left and right of) a vehicle in which the smart entry system (SES) and an idling stop system (ISS) are installed, for example, if ID authentication fails (key lost) in the vehicle due to a radio wave (a jamming radio wave) of a wireless device when restarting an engine after the engine has been automatically stopped by idling stop, the engine is not restarted and the vehicle is not started.

In order to solve the above described problem, Japanese Unexamined Patent Application Publication (JP-A) No. 2006-307694 discloses a technology (an idle-stop start control device for vehicle) to achieve, in a vehicle including both an idle-stop start system (an ISS system) and a smart engine starter system (a SES system), both prevention of reduction in antitheft performance of the SES system and smooth automatic start of an engine in the ISS system with no difficulty. More specifically, in this technology (device), when the presence of an occupant in a vehicle is detected, an automatic start of an engine is permitted without using establishment of ID authentication of a mobile device as a condition and, when the presence of an occupant in a vehicle is not detected, ID authentication of a mobile device is not established, and a mobile device is not in the vehicle, an alarm is issued by a notification lamp and a buzzer in the vehicle for a predetermined time to restrict automatic start of the engine.

SUMMARY

An aspect of the present disclosure provides an idling stop control device capable of automatically stopping an engine when a predetermined idling stop condition is satisfied and restarting the engine when a predetermined restart condition is satisfied. The idling stop control device includes an authenticator installed in a vehicle and configured to perform authentication via a wireless communication between the authenticator and a mobile device, a storage configured to store an authentication result and an authentication time of the authentication by the authenticator as an authentication history, a getting-off detector configured to detect getting-off of an occupant, and an engine restart permitter configured to determine permission or prohibition of restart of the engine in accordance with the authentication history and getting-off information of the occupant. While the vehicle travels, the authenticator repeatedly performs an authentication operation between the authenticator and the mobile device at predetermined intervals. While the vehicle travels, the storage stores the authentication result and the authentication time of the authentication by the authenticator as the authentication history. In restarting the engine in an idling stop state, the engine restart permitter permits restart of the engine when the authentication by the authenticator is successful and permits, in a case where the authentication by the authenticator fails, restart of the engine when a history of success of authentication has been stored in the storage during travel and getting-off of the occupant is not detected after the authentication has been successful.

An aspect of the present disclosure provides an idling stop control device capable of automatically stopping an engine when a predetermined idling stop condition is satisfied and restarting the engine when a predetermined restart condition is satisfied. The idling stop control device includes circuitry installed in a vehicle. The circuitry is configured to perform authentication via a wireless communication between the authenticator and a mobile device. The circuitry is configured to store an authentication result and an authentication time of the authentication as an authentication history. The circuitry is configured to detect getting-off of an occupant. The circuitry is configured to determine permission or prohibition of restart of the engine in accordance with the authentication history and getting-off information of the occupant. While the vehicle travels, the circuitry repeatedly performs an authentication operation between the circuitry and the mobile device at predetermined intervals. While the vehicle travels, the circuitry stores the authentication result and the authentication time of the authentication as the authentication history. In restarting the engine in an idling stop state, the circuitry permits restart of the engine when the authentication by the authenticator is successful and permits, in a case where the authentication fails, restart of the engine when a history of success of authentication has been stored in the circuitry during travel and getting-off of the occupant is not detected after the authentication has been successful.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

FIG. 3 is a flowchart illustrating process steps of idling stop processing by an idling stop control device according to the embodiment.

DETAILED DESCRIPTION

Figure 1:
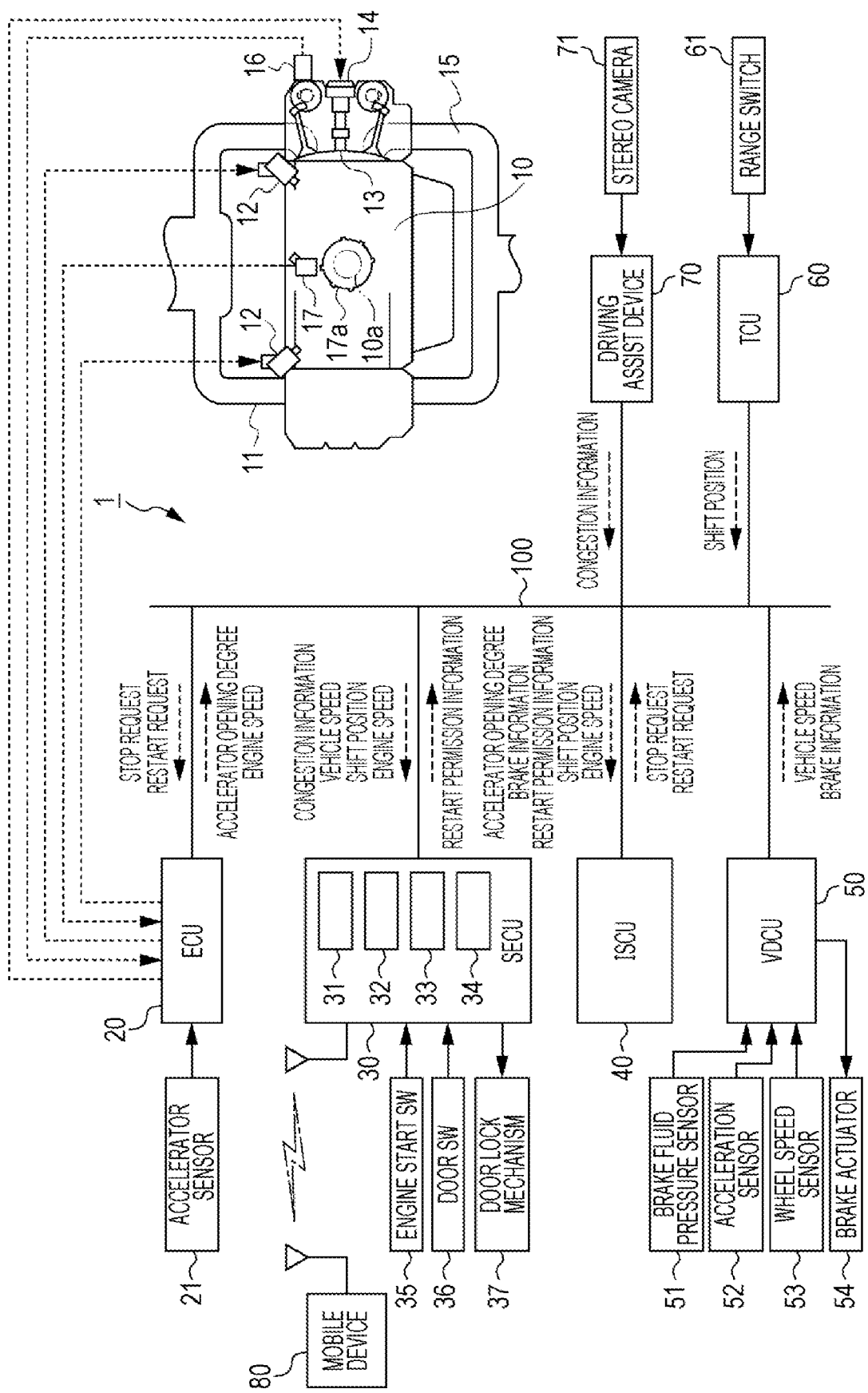
FIG. 1 is a block diagram illustrating a configuration of an idling stop control device according to an embodiment.

In the following, a preferred but non-limiting embodiment of the disclosure is described in detail with reference to the accompanying drawings. Note that sizes, materials, specific values, and any other factors illustrated in the embodiment are illustrative for easier understanding of the disclosure, and are not intended to limit the scope of the disclosure unless otherwise specifically stated. Further, elements in the following example embodiment which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale. In recent years, a so-called relay attack to a smart entry system (SES) has been a problem. In a relay attack, first, two radio relay devices are prepared, one of the radio relay devices is disposed near a mobile device, and the other one of the radio relay devices is disposed near a door of a vehicle (near an onboard device). Then, a weak radio wave that is output from the onboard device is received by the other one of the radio relay devices, is amplified, and the amplified signal is relayed to the radio relay device disposed near the mobile device, and this radio relay device transmits an ID request signal to the mobile device. When the mobile device returns a correct ID in response to the ID request signal, the two radio relay devices relay the correct ID and return it to the vehicle (the onboard device). Thereafter, when the onboard device authenticates the ID as an authorized ID, the door of the vehicle is unlocked and start of an engine is enabled by pressing a start button.

Under such a relay attack, in the above described technology of JP-A 2006-307694, once authentication is successful when an occupant gets on a vehicle, restart of the engine is not prohibited (that is, continuous driving is enabled) while an occupant is on the vehicle even when the occupant does not carry the mobile device (a smart key), and therefore, this technology is not appropriate in terms of theft prevention. Therefore, a technology that is able to further increase antitheft performance while improving restartability from idling stop has been desired.

The present disclosure has been devised to solve the above described problem and it is therefore an object of the present disclosure to provide an idling stop control device that is able to achieve both further increase in antitheft performance and engine restartability from idling stop at a time of failure of authentication (at a time of key lost) in a vehicle on which a so-called smart entry system is installed.

First, a configuration of an idling stop control device 1 according to the embodiment will be described with reference to FIG. 1. FIG. 1 is a block diagram illustrating a configuration of the idling stop control device 1. Note that, in this embodiment, the idling stop control device 1 is installed in a vehicle to which a so-called smart entry system (SES) is applied. The smart entry system has a keyless entry function that is able to release a door lock without using a key and a keyless start function that is able to start the engine without using a key.

The idling stop control device 1 is a device configured to control the idling stop function of automatically stopping an engine 10 when the vehicle is temporarily stopped, for example, to wait for a traffic signal to change and, when the vehicle is started, detecting release of stepping on a brake pedal of a driver, for example, and then automatically restarting the engine 10 in a state in which the smart entry system is successful in ID authentication (restart is permitted). In particular, the idling stop control device 1 has a function of achieving both further increase in antitheft performance and restartability of the engine from idling stop at a time of failure of authentication (at a time of key lost). Note that details of this function will be described later.

The engine 10 is, for example, a horizontally-opposed four-cylinder gasoline engine. Also, the engine 10 is a cylinder injection engine configured to directly inject fuel into cylinders (tubes). In the engine 10, air that has been taken in from an air cleaner is squeezed by a throttle valve provided in an intake pipe, passes through an intake manifold 11, and is taken in each of the cylinders formed in the engine 10.

An injector 12 configured to inject fuel into a cylinder is attached to each of the cylinders of the engine 10. The injector 12 directly injects fuel that has been pressurized by a high-pressure fuel pump to a combustion chamber of each of the cylinders.

Also, an ignition plug 13 configured to ignite an air-fuel mixture and an igniter-built-in coil 14 configured to apply a high voltage to the ignition plug 13 are attached to a cylinder head of each of the cylinders. In each of the cylinders of the engine 10, the air-fuel mixture of the air that has been taken in and the fuel that has been injected by the injector 12 is ignited by the ignition plug 13 and is burned. Emissions after the air-fuel mixture has been burned are discharged through an exhaust tube 15.

A cam angle sensor 16 that is used for performing cylinder determination of the engine 10 is attached near a cam shaft of the engine 10. Also, a crank angle sensor 17 configured to detect a rotational position of a crankshaft 10a is attached near the crankshaft 10a of the engine 10. For example, a timing rotor 17a in which protrusions of 34 teeth with two teeth lacking are formed at intervals of 10 degrees is attached to an end portion of the crankshaft 10a, and the crank angle sensor 17 detects a rotational position of the crankshaft 10a by detecting whether there are the protrusions of the timing rotor 17a. Note that, as the cam angle sensor 16 and the crank angle sensor 17, for example, sensors which employ a hall element, an MR element, or the like, are used in some embodiments.

These sensors are coupled to an engine control unit (which will be hereinafter referred to as an "ECU") 20. Also, an accelerator sensor 21 configured to detect a stepping amount of an accelerator pedal (an accelerator pedal opening degree) or the like is coupled to the ECU 20. The ECU 20 includes a microprocessor that performs an arithmetic operation, an EEPROM configured to store a program configured to cause the microprocessor to execute each process or the like, a RAM configured to store various types of data, such as a result of the arithmetic operation or the like, a backup RAM memory contents of which are held using a battery, an input and output I/F, and the like. Also, the ECU 20 includes an injector driver configured to drive the injector 12, an output circuit configured to output an ignition signal, or the like.

In the ECU 20, a cylinder is determined based on an output of the cam angle sensor 16 and engine speed is calculated from an output of the crank angle sensor 17. Also, in the ECU 20, various types of information, such as an intake air amount, an intake manifold pressure, the accelerator pedal opening degree, an air-fuel ratio of the air-fuel mixture, water temperature or oil temperature of the engine 10, or the like, are acquired based on detection signals that are input from various types of sensors. Then, based on the above described various types of information that have been acquired, the ECU 20 comprehensively controls the engine 10 by controlling a fuel injection amount, an ignition timing, and various devices. Also, the ECU 20 automatically stops the engine 10 (idling stop), based on an engine stop request signal from an idling stop control unit 40, which will be described later, and restarts the engine 10, based on an engine restart request signal. Note that details will be described later.

The ECU 20 is coupled to a smart entry control unit (SECU) 30, an idling stop control unit (which will be hereinafter referred to as an "ISCU") 40, a vehicle dynamic control unit (which will be hereinafter referred to as a "VDCU") 50, a transmission control unit (which will be hereinafter referred to as a "TCU") 60, a driving assist device 70, or the like so as to be mutually communicable with the units via an inter-vehicle communication line 100, such as a controller area network (CAN) or the like. The ECU 20 transmits information, such as the engine speed, an accelerator opening degree, or the like, which has been acquired, to the SECU 30, the ISCU 40, the TCU 60, or the like via the CAN 100. Also, the ECU 20 receives the engine stop request signal and the engine restart request signal from the ISCU 40 via the CAN 100.

A brake fluid pressure sensor 51 configured to detect a master cylinder pressure (a brake fluid pressure (oil pressure)) of a brake actuator 54, an acceleration sensor 52 configured to detect forward and backward acceleration and horizontal acceleration, a wheel speed sensor 53 configured to detect a rotational speed of each wheel of the vehicle (vehicle speed), or the like is coupled to the VDCU 50. The VDCU 50 drives the brake actuator 54 in accordance with an operation amount of a brake pedal to brake the vehicle, and also ensures vehicle stability at turning by detecting a vehicle behavior by various sensors (for example, the wheel speed sensor 53, the acceleration sensor 52, a steering angle sensor, a yaw rate sensor, or the like) and suppressing a side slide by brake control by automatic pressurization and torque control of the engine 10. The VDCU 50 transmits braking information (brake information), such as the master cylinder pressure (the brake fluid pressure) or the like, the wheel speed (the vehicle speed), or the like, which has been detected, to the SECU 30, the ISCU 40, or the like via the CAN 100. Note that, the wheel speed sensor 53 functions as an acquirer in an embodiment of the present disclosure.

A range switch 61 configured to detect a selection position (a shift position) of a shift lever or the like is coupled to the TCU 60. The TCU 60 follows a shift map and automatically changes a gear ratio in accordance with a driving state (for example, the accelerator pedal opening, the vehicle speed, or the engine speed) of the vehicle. Note that the shift map is stored in the EEPROM in the TCU 60. The TCU 60 transmits information, such as the selectin position (the shift position) of the shift lever or the like, to the SECU 30, the ISCU 40, or the like via the CAN 100.

The driving assist device 70 has a function (an automatic braking function/a pre-crash braking function) configured to detect an external environment of the vehicle (for example, a traveling environment in front of the vehicle) and issue an alarm for a front obstacle or perform automatic braking. Also, the driving assist device 70 has a function configured to assist a driving operation of the driver by performing following control or alarm control with respect to a preceding vehicle that has been detected.

The driving assist device 70 processes image data that has been captured by a stereo camera 71 including, for example, a pair of cameras, which acquires images of a view in front of the vehicle, and detects the traveling environment (the external environment) of outside of the vehicle, such as, for example, a driving lane condition, a preceding vehicle, an obstacle, or the like. In this process, the driving assist device 70 extracts a preceding vehicle from captured images by edge extraction processing, pattern recognition processing, or the like, calculates, based on a difference in position of the preceding vehicle in captured left and right images, an inter-vehicle distance between the vehicle and the preceding vehicle by a triangulation method, and also, calculates relative speed from an amount of change from a distance that has been calculated in a previous frame. Also, the driving assist device 70 generates congestion information from such information. The driving assist device 70 transmits the external environment information, the congestion information, or the like which has been detected to the ECU 20, the SECU 30, the ISCU 40, the VDCU 50, or the like via the CAN 100.

An engine start switch 35 that is, for example, a push-switch provided in an instrument panel of the vehicle and receives a start operation of the engine 10, a door switch 36 configured to detect an opening and closed state of a door of the vehicle, a door lock mechanism 37 configured to open and close the door of the vehicle, an antenna configured to transmit and receive an electronic wave, or the like is coupled to the SECU 30. Also, the SECU 30 receives the engine speed, the shift position, the vehicle speed information, the congestion information, or the like which has been described above, from the ECU 20, the VDCU 50, the TCU 60, and the driving assist device 70 via the CAN 100.

As a basic function, the SECU 30 automatically unlocks, in a case where the occupant (the driver) carries a mobile device 80 (a smart key), the door lock mechanism 37 by approach of the occupant (the driver) to the vehicle and puts the engine 10 in a start possible state.

More specifically, the SECU 30 transmits, when the mobile device 80 carried by the occupant (the driver) approaches, a request signal that prompts the mobile device 80 to transmit an ID code and also receives a signal including an ID code transmitted by the mobile device 80. The SECU 30 compares the ID code received from the mobile device 80 and an ID code stored to one another, in a case where both of the ID codes match (that is, ID authentication is successful), outputs a control signal to the door lock mechanism 37 to unlock, and outputs a control signal (engine start permission information) to the ECU 20 to put the engine 10 in a start possible state. Thus, thereafter, when the occupant (the driver) presses down the engine start switch 35, the engine 10 is cranked by a starter motor or the like and the engine 10 is started.

Specifically, the SECU 30 and the ISCU 40, which is be described later, have a function configured to achieve both further increase in antitheft performance and restartability of the engine from idling stop at a time of failure of authentication (at a time of key lost).

Therefore, the SECU 30 functionally includes an authenticator 31, a storage 32, a getting-off detector 33, and an engine restart permitter 34. The SECU 30 includes a microprocessor configured to perform an arithmetic operation, an EEPROM configured to store a program that causes the microprocessor to execute each process or the like, a RAM configured to store various types of data, such as a result of the arithmetic operation or the like, a backup RAM memory contents of which are held using a battery, an input and output I/F, or the like. In the SECU 30, the program stored in the EEPROM is executed by the microprocessor, and thereby, functions of the authenticator 31, the storage 32, the getting-off detector 33, and the engine restart permitter 34 are realized.

The authenticator 31 performs ID authentication in the above described manner using a wireless communication with the mobile device 80. That is, in an embodiment of the present disclosure the authenticator 31 may serve as an "authenticator". Specifically, the authenticator 31 repeatedly performs an ID authentication operation between the authenticator 31 and the mobile device 80 at predetermined intervals while the vehicle travels. In performing ID authentication, the authenticator 31 sets in some embodiments a time interval at which the authenticator 31 repeatedly executes ID authentication such that the time interval (each of the above described predetermined intervals) increases as average vehicle speed is determined to be low. Note that it is possible to calculate the average speed of the vehicle, based on the vehicle speed information and the congestion information. A result of authentication by the authenticator 31 is output to the storage 32 or the like.

The storage 32 includes a memory, such as a RAM or the like, and stores an authentication result and an authentication time of authentication by the authenticator 31. Accordingly, while the vehicle travels, the storage 32 stores the authentication result and the authentication time as an authentication history. That is, in an embodiment of the present disclosure, the storage 32 may serve as a "storage". Note that, when the vehicle is in a stopped state (is parked), the storage 32 stops an operation of storing the authentication result and the authentication time as an authentication history. Authentication history information stored in the storage 32 is read by the engine restart permitter 34. Note that the authentication time may be a relative time, that is, for example, what minutes before, in addition to an absolute time, such as what hour, minute, and second.

The getting-off detector 33 detects getting-off of the occupant (the driver). That is, in an embodiment of the present disclosure, the getting-off detector 33 may serve as a "getting-off detector". Note that the getting-off detector 33 detects in some embodiments whether the occupant (the driver) has gotten off the vehicle, based on, in addition to a result of detection of the door switch 36 and a driving history of the door lock mechanism 37, an output of a seat sensor, an operation state of (or a contact with) a steering wheel, image information of a surveillance monitor (a camera), or the like. Getting-off information of the occupant (the driver) acquired by the getting-off detector 33 is output to the engine restart permitter 34.

The engine restart permitter 34 determines permission and prohibition of restart of the engine 10, based on the authentication history and the getting-off information described above. That is, in an embodiment of the present disclosure, the engine restart permitter 34 may serve as an "engine restart permitter". More specifically, in a case where authentication by the authenticator 31 is successful in restarting the engine 10 in an idling stop state, the engine restart permitter 34 permits restart of the engine 10.

On the other hand, in a case where, in restarting the engine 10 in an idling stop state, authentication by the authenticator 31 fails, the engine restart permitter 34 permits restart of the engine 10 when, after a history of success of authentication is stored in the storage 32 during travel and the authentication is successful, getting-off of the driver (the occupant) is not detected. However, when a history of success of authentication is not stored in the storage 32 during travel (or when information that the authentication has failed is stored), the engine restart permitter 34 prohibits restart of the engine 10 even without detecting getting-off of the driver (the occupant).

Note that, instead of setting the time interval at which an authentication operation is repeatedly executed such that the time interval increases as the average vehicle speed decreases (that is, without changing an authentication execution interval), when authentication fails in restarting the engine 10 in an idling stop state, whether restart is possible may be determined by the engine restart permitter 34 by going back to an older authentication history as the average vehicle speed before the vehicle stops is determined to be low. Note that permission information that permits or prohibition information that prohibits restart of the engine 10, which has been generated by the engine restart permitter 34, is output to the ISCU 40 via the CAN 100.

The ISCU 40 includes a microprocessor configured to perform arithmetic operation, an EEPROM configured to store a program that causes the microprocessor to execute each process or the like, a RAM configured to store various types of data, such as a result of the arithmetic operation or the like, a backup RAM memory contents of which are held using a battery, an input and output I/F, or the like.

In order to reduce fuel consumption and reduce emission discharged, the ISCU 40 outputs, in a case where a predetermined idling stop condition is satisfied, an engine stop request signal to the ECU 20 via the CAN 100 to automatically stop the engine 10. Thereafter, when engine restart permission information is received from the SECU 30 and a predetermined idling stop release condition (a restart condition) is satisfied, the ISCU 40 outputs the engine restart request signal to the ECU 20 via the CAN 100 to restart the engine 10.

More specifically, for example, in a case where such conditions that the brake pedal has been stepped on (that is, the brake fluid pressure is higher than a restart permission brake fluid pressure (a restart permission threshold)), that the vehicle speed is zero, and/or that the shift position is in a D (drive) range are satisfied, the ISCU 40 stops the engine 10 to execute idling stop by transmitting an engine stop request signal to the ECU 20 via the CAN 100 to stop fuel injection and ignition to the engine 10. On the other hand, when the engine restart permission information is received from the SECU 30 and, for example, stepping on the brake pedal is released (that is, when the brake fluid pressure is the restart permission brake fluid pressure or lower), or when the shift position is put in a P (parking) range, the ISCU 40 transmits the engine restart request signal that requests restart of the engine 10 to the ECU 20 via the CAN 100 to restart the engine 10.

Note that, when the authenticator 31 of the SECU 30 fails in authentication during travel, execution of idling stop may be prohibited.

When the ECU 20 receives the engine restart request signal from the ISCU 40, the ECU 20 restarts the engine 10. That is, the ECU 20 starts, for example, a starter motor, to start cranking of the engine 10. Then, the ECU 20 drives the injector 12 at a predetermined fuel injection timing to inject fuel, and thereafter, restarts the engine by igniting a fuel-air mixture at a predetermined ignition timing.

Figure 2:
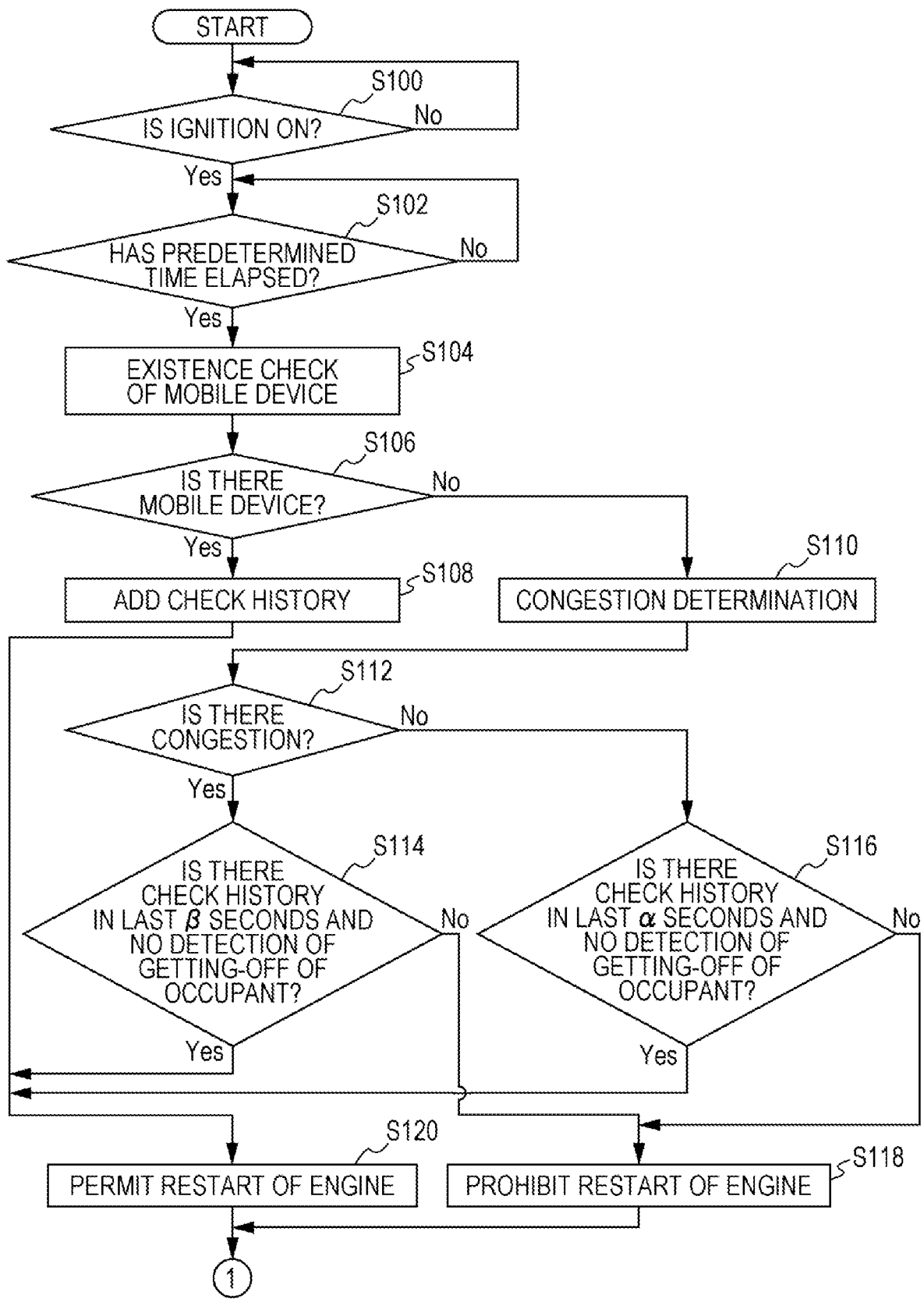
FIG. 2 is a flowchart illustrating process steps of idling stop processing by an idling stop control device according to the embodiment.

Next, with reference to FIG. 2 and FIG. 3, an operation of the idling stop control device 1 will be described. FIG. 2 and FIG. 3 are flowcharts illustrating process steps of idling stop processing by the idling stop control device 1. This processing is repeatedly executed at predetermined intervals mainly in the SECU 30 and the ISCU 40.

First, in Step S100, whether an ignition-on state has been established is determined. Then, when an ignition-on state has been established, a process proceeds to Step S102. On the other hand, when an ignition-on state has not been established, this step is repeatedly executed until an ignition-on state is established.

Next, in Step S102, whether a predetermined time has elapsed is determined during travel. Then, when the predetermined time has elapsed, the process proceeds to Step S104. On the other hand, when the predetermined time has not been elapsed, this step is repeatedly executed until the predetermined time elapses.

Subsequently, in Step S104, existence check (ID authentication) of the mobile device 80 (the smart key) is performed. In Step S106, whether there is the mobile device 80 (whether ID authentication is successful) is determined. Then, when there is the mobile device 80 (when ID authentication is successful), the process proceeds to Step S108. On the other hand, when there is not the mobile device 80 (when ID authentication fails), the process proceeds to Step S110. Note that a result of failure of ID authentication may be added to (stored in) an authentication history.

In Step S108, a result (a check history) of success of ID authentication is added to (stored in) the authentication history with an authentication time. Thereafter, the process proceeds to Step S120.

In Step S110, congestion determination is performed based on the average vehicle speed or the like. In Step S112, whether there is congestion is determined. Then, when it has been determined that there is congestion, the process proceeds to Step S114. On the other hand, when it is determined that there is not congestion, the process proceeds to Step S116.

In Step S114, whether there is a check history (a history of success of ID authentication) in last $\beta$ seconds and whether getting-off of the occupant is not detected after ID authentication has been successful is determined. Then, when there is a check history and getting-off is not detected, the process proceeds to Step S120. On the other hand, when there is not a check history (or there is a history of failure of ID authentication), or when getting off is detected, the process proceeds to Step S118.

In Step S116, whether there is a check history (a history of success of ID authentication) in last $\alpha$ ($<\beta$) seconds and whether getting off of the occupant is not detected after ID authentication is successful is determined. Then, when there is a check history and getting off is not detected, the process proceeds to Step S120. On the other hand, when there is not a check history (or there is a history of failure of ID authentication) or when getting off is detected, the process proceeds to Step S120.

In Step S118, an engine restart prohibition state (a key lost state) is established. On the other hand, in Step S120, an engine restart permission state is established.

Next, in Step S122, whether an idling stop prohibition flag is "1" (whether the idling stop prohibition flag is set) is determined. Then, when the idling stop prohibition flag is "1", the process proceeds to Step S128. On the other hand, when the idling stop prohibition flag is "0", the process proceeds to Step S124.

In Step S124, whether the engine 10 is in operation and an engine restart prohibition state (a key lost state) has been established is determined. Then, when the condition is affirmative, the process proceeds to Step S126. On the other hand, when the condition is negative, the process proceeds to Step S130.

In Step S126, the idling stop prohibition flag is set to be "1". Thereafter, the process proceeds to Step S128.

In Step S128, execution of idling stop is prohibited and an operation of the engine 10 continues. Thereafter, this process is suspended.

In Step S130, whether the engine 10 is in operation is determined. Then, when the engine 10 is in operation, the process proceeds to Step S132. On the other hand, when the engine 10 is stopped (not in operation), the process proceeds to Step S136.

In Step S132, whether the predetermined idling stop condition is satisfied is determined. Then, when the predetermined idling stop condition is satisfied, the process proceeds to Step S134. On the other hand, when the predetermined idling stop condition is not satisfied, this process is suspended. Note that the idling stop condition is as described above, and therefore, detailed description thereof will be omitted.

In Step S134, idling stop is executed and the engine 10 is automatically stopped. Thereafter, this process is suspended.

During idling stop, in Step S136, whether a predetermined restart condition is satisfied is determined. Then, when the predetermined restart condition is satisfied, the process proceeds to Step S138. On the other hand, when the predetermined restart condition is not satisfied, this process is suspended. Note that the restart condition is as described above, and therefore, detailed description thereof will be omitted.

In Step S138, the engine 10 is automatically restarted. Thereafter, this process is suspended. Note that processing of Steps S122, S126, and S128 (idling stop prohibition processing) described above may be omitted.

As described above, according to this embodiment, an ID authentication operation is repeatedly performed between the authenticator 31 and the mobile device 80 at predetermined intervals while the vehicle travels. The inter-vehicle distance from another vehicle around the vehicle is increased during travel. That is, for example, even when there is another vehicle, on which a high output radio device is mounted, in front of or behind the vehicle, the ID authentication operation is hardly influenced by a radio wave of the radio device. Therefore, presumably, ID authentication is repeatedly executed during travel (at predetermined intervals), and thus, when there is the mobile device 80 in the vehicle, ID authentication is successful with a high probability. Therefore, even in a case where ID authentication fails in restarting the engine 10 in an idling stop state, when a history of success of ID authentication is stored during travel and getting-off of the driver (the occupant) from the vehicle is not detected after the authentication has been successful, that is, when a probability that the failure of ID authentication is temporary due to a radio wave environment therearound or the like is high, restart of the engine 10 is permitted. Thus, restartability of idling stop at a time of failure of authentication (at a time of key lost) can be improved. On the other hand, even in a case where getting-off of the deriver (the occupant) is not detected, when a history of success of ID authentication is not stored during travel (or in a case where information of failure of ID authentication is stored), that is, when a probability that there is not the mobile device 80 in the vehicle, restart of the engine 10 is prohibited. Accordingly, it is possible to achieve further increase in antitheft performance. As a result, it is possible to achieve both further increase in antitheft performance and engine restartability from idling stop at a time of failure of authentication (at a time of key lost) in a vehicle on which a so-called smart entry system is installed.

According to this embodiment, the time interval (each of the predetermined intervals) at which an authentication operation is repeatedly executed is set to increase as the average vehicle speed is determined to be low. Normally, there is a tendency that, when the average speed is low, the inter-vehicle distance is reduced and, when the average speed is high, the inter-vehicle distance is increased. Therefore, presumably, for example, in a case where the average speed is low at a time of congestion or the like, it takes a relatively long time for the radio wave environment to be improved when there is another vehicle on which a large output radio device is mounted in front of or behind the vehicle. Therefore, in such a case, it is possible to increase reliability of ID authentication by increasing the authentication execution interval.

According to this embodiment, when ID authentication fails in restarting the engine 10 in an idling stop state, whether restart is possible is determined by going back to an older history as the average vehicle speed before the vehicle is stopped is determined to be low. As described above, there is a tendency that, when the average speed is low, the inter-vehicle distance is reduced and, when the average speed is high, the inter-vehicle distance is increased. Therefore, presumably, for example, in a case where the average speed is low at a time of congestion or the like, it takes a relatively long time for the radio wave environment to be improved when there is another vehicle on which a large output radio device is mounted in front of or behind the vehicle. Therefore, in such a case, it is possible to increase reliability of ID authentication by going back to an older authentication history.

According to this embodiment, when the vehicle is in a stopped state (is parked), an operation of storing an authentication result and an authentication time as an authentication history is stopped. That is, when there is a possibility that the radio wave environment around the vehicle deteriorates, storing the authentication result (the authentication history) is stopped. Therefore, it is possible to increase validity of the authentication result (whether there is the mobile device 80).

In the above described manner, it is possible to improve engine restartability from idling stop at a time of failure of authentication (at a time of key lost).

The embodiment of the present disclosure has been described above. The present disclosure is not limited to the above described embodiment and various modifications and changes may be made to the embodiment. For example, a system configuration of the above described embodiment is merely an example and a system configuration of the present disclosure is not limited to the above described embodiment. For example, the ECU 20, the SECU 30, and the ISCU 40 may be integrated as one unit.

Also, in the above described embodiment, a configuration in which the SECU 30 acquires data from another control unit via the CAN 100 is employed. A configuration in which the above described various sensors are directly coupled (or data thereof are input) to the SECU 30 may also be employed.

Furthermore, in the above described embodiment, congestion information is acquired from the driving assist device 70. For example, a configuration in which congestion information is acquired from a car navigation system or the like may also be employed. Note that it is possible to appropriately set any repeating cycle (a predetermined interval) of the above described authentication operation.

In the above described embodiment, in a case where ID authentication fails in restarting the engine 10 in an idling stop state, whether restart is possible is determined by going back to an older history as the average speed before the vehicle stops is determined to be low. Instead of such method, for example, a time interval at which ID authentication is repeatedly executed may be set to increase as the average speed during travel is determined to be low. Thus, it is also possible to improve reliability of ID authentication.

According to the present disclosure, it is possible to achieve both of further increase in antitheft performance and engine restartability from idling stop at a time of failure of authentication (at a time of key lost) in a vehicle on which a so-called smart entry system is installed.

The invention claimed is:

1. An idling stop control device capable of automatically stopping an engine when a predetermined idling stop condition is satisfied and restarting the engine when a predetermined restart condition is satisfied, the idling stop control device comprising: an authenticator installed in a vehicle and configured to perform authentication via a wireless communication between the authenticator and a mobile device; a storage configured to store an authentication result and an authentication time of the authentication by the authenticator as an authentication history; a getting-off detector configured to detect getting-off of an occupant; and an engine restart permitter configured to determine permission or prohibition of restart of the engine in accordance with the authentication history and getting-off information of the occupant, wherein the authenticator repeatedly performs, while the vehicle travels, an authentication operation between the authenticator and the mobile device at predetermined intervals, the storage stores, while the vehicle travels, the authentication result and the authentication time of the authentication by the authenticator as the authentication history, the engine restart permitter, in restarting the engine in an idling stop state, permits restart of the engine when the authentication by the authenticator is successful, and permits, in a case where the authentication by the authenticator fails, restart of the engine when a history of success of authentication has been stored in the storage during travel and the getting-off of the occupant is not detected after the authentication has been successful.

2. The idling stop control device according to claim 1, wherein the engine restart permitter prohibits, in the case where the authentication by the authenticator fails in restarting the engine in the idling stop state, restart of the engine when the history of success of authentication has not been stored in the storage during travel and the getting-off of the occupant is not detected.

3. The idling stop control device according to claim 2, further comprising:
an acquirer configured to acquire average vehicle speed of the vehicle or an index value that has a correlation with the average vehicle speed, wherein
the authenticator sets a time interval at which the authentication operation is repeatedly executed such that the time interval increases as the average vehicle speed is determined to be low.

4. The idling stop control device according to claim 3, wherein
the storage stops, when the vehicle is in a stopped state, an operation of storing the authentication result and the authentication time as the authentication history.

5. The idling stop control device according to claim 4, wherein
idling stop is prohibited when the authenticator fails in the authentication during travel.

6. The idling stop control device according to claim 3, wherein
idling stop is prohibited when the authenticator fails in the authentication during travel.

7. The idling stop control device according to claim 2, further comprising: an acquirer configured to acquire average vehicle speed of the vehicle or an index value that has a correlation with the average vehicle speed, wherein the engine restart permitter determines, when the authentication by the authenticator fails in restarting the engine in the idling stop state, whether restart is possible by going back to an older authentication history as the average vehicle speed before the vehicle stops is determined to be low.

8. The idling stop control device according to claim 4, wherein
the storage stops, when the vehicle is in a stopped state, an operation of storing the authentication result and the authentication time as the authentication history.

9. The idling stop control device according to claim 8, wherein
idling stop is prohibited when the authenticator fails in the authentication during travel.

10. The idling stop control device according to claim 7, wherein
idling stop is prohibited when the authenticator fails in the authentication during travel.

11. The idling stop control device according to claim 2, wherein
the storage stops, when the vehicle is in a stopped state, an operation of storing the authentication result and the authentication time as the authentication history.

12. The idling stop control device according to claim 11, wherein
idling stop is prohibited when the authenticator fails in the authentication during travel.

13. The idling stop control device according to claim 2, wherein
idling stop is prohibited when the authenticator fails in the authentication during travel.

14. An idling stop control device capable of automatically stopping an engine when a predetermined idling stop condition is satisfied and restarting the engine when a predetermined restart condition is satisfied, the idling stop control device comprising circuitry installed in a vehicle and configured to perform authentication via a wireless communication between the circuitry and a mobile device; store an authentication result and an authentication time of the authentication as an authentication history; detect getting-off of an occupant; and determine permission or prohibition of restart of the engine in accordance with the authentication history and getting-off information of the occupant, wherein the circuitry repeatedly performs, while the vehicle travels, an authentication operation between the circuitry and the mobile device at predetermined intervals, the circuitry stores, while the vehicle travels, the authentication result and the authentication time of the authentication as the authentication history, the circuitry, in restarting the engine in an idling stop state, permits restart of the engine when the authentication is successful, and permits, in a case where the authentication fails, restart of the engine when a history of success of authentication has been stored in the circuitry during travel and the getting-off of the occupant is not detected after the authentication has been successful.

* * * * *